United States Patent [19]

Knight

[11] Patent Number: 4,583,614

[45] Date of Patent: Apr. 22, 1986

[54] MOUNTING POWER UNIT IN FRONT WHEEL VEHICLE

[76] Inventor: Robert J. Knight, c/o Dunlop Limited of 2 Parade, Sutton Coldfield, West Midlands, England

[21] Appl. No.: 467,902

[22] Filed: Feb. 18, 1983

[30] Foreign Application Priority Data

Feb. 22, 1982 [GB] United Kingdom ............... 8205102

[51] Int. Cl.⁴ .............................................. B60K 5/04
[52] U.S. Cl. .................................................. 180/295
[58] Field of Search ............... 180/291, 295, 299, 300

[56] References Cited

U.S. PATENT DOCUMENTS 3,473,620 10/1969 Muller et al. ................... 180/295
4,240,517 12/1980 Harlow, Jr. ..................... 180/295
4,271,920 6/1981 Barthelemy .

Primary Examiner—Richard A. Bertsch
Attorney, Agent, or Firm—Stevens, Davis, Miller & Mosher

[57] ABSTRACT

A front wheel drive vehicle in which the suspension assemblies are mounted on the power unit to form a combined assembly including the steering assembly. The combined assembly is resiliently mounted by flexible mountings in the body so that vibrational forces from the power unit and the front wheels are attenuated in the combined assembly and the flexible mountings.

10 Claims, 7 Drawing Figures

MOUNTING POWER UNIT IN FRONT WHEEL VEHICLE

This invention relates to improvements to the mounting of power unit and suspension assemblies in front wheel drive vehicles.

Hitherto the power units of such vehicles have been mounted in the vehicle body by flexible mountings designed specifically to absorb noise and vibration emanating from the engine often with the use of a subframe and the suspension assemblies have been separately mounted in the vehicle body by different mountings specifically designed to absorb noise and vibration from the road. While this approach may nominally provide an effective mounting system for the power unit some vibration from the power unit is in a front wheel drive vehicle transmitted by the drive shafts to the hub and wheel assemblies. This vibration and the generally dominant vibrations in the hub and wheel assemblies from the road surface and tire and wheel irregularities are then connected directly to the vehicle body by the suspension links, springs and dampers and the flexible suspension mountings. Isolation of noise and vibration from the body in typical existing arrangements has been approached by means of adjusting the characteristics of the mounting components for the best compromise, but flexible mountings alone do not provide a very effective attenuation of vibration.

The present invention proposes a quite different approach to the problem of preventing the transmission of noise and vibration to the vehicle body in which the suspension assemblies and steering assembly are mounted upon the power unit to form a combined assembly which is resiliently mounted in the vehicle body by flexible mountings.

The resultant assembly connects the vibration forces from the wheel hubs into the large effective mass of the power unit, which impedes the transmission of those forces to the flexible mountings, and hence to the body, much more effectively than in all known front wheel drive arrangements.

It should be noted that the combined assembly comprises the engine, clutch, gear-box, steering gear differential and final drive assemblies and thus the effective mass is substantial.

The suspension is preferably entirely mounted upon the power unit by means of the suspension levers or wishbones, the suspension spring and/or suspension damper and the steering pivots or king pins all being attached to the power unit and not to the vehicle body. Advantage may also be gained from the invention, however, in the case of MacPherson strut type suspensions by connecting the lower ends of the struts to levers or wishbones which are attached to the power unit. In this case the attenuation of vibration will not be so effectively obtained as some vibration is transmitted directly through the top mounting of the MacPherson strut to the vehicle body but much of the vibration arising, for example, from the longitudinal forces generated by radial ply tires, and imposed in the lower wishbone is attenuated advantageously in the power unit mass.

The invention also allows attenuation of vibration forces originating in the engine by means of arranging the flexible mountings between the power unit and the vehicle body to have a resultant direction of minimum stiffness substantially in the direction of the plane of maximum imbalance of the engine. In general it is also preferred to arrange that the axis of maximum stiffness of the mountings is substantially at right angles to the plane of maximum imbalance of the engine.

Additionally a transversely extending locating link may be provided to locate the combined assembly transversely of the vehicle with adequate stiffness to withstand cornering forces arising between the body and the combined assembly. This may be in the form of a link or strut and may be in front of the front axle centreline at a distance chosen so as to impose the desired amount of understeer deflection on the combined assembly when cornering forces occur.

Various mounting arrangements are possible within the scope of the invention and the arrangement chosen depends on the engine layout. In most embodiments the engine is transverse and in some cases it may be inclined.

One preferred arrangement, however, utilize a substantially vertical engine which is mounted in the body by means of a pair of lower mountings one at either side of the vehicle which are mounted with their planes of maximum stiffness substantially in the longitudinal direction of the vehicle and which extend from the lower part of the combined assembly rearwards to mounting points provided on the body. An upper mounting is also provided which extends rearwardly and substantially parallel to the lower mountings such that the upper and lower mountings act as a means of controlling the engine in pitch, but allowing vertical movement of the combined assembly in the direction of the plane of maximum imbalance of the power unit which is controlled by a mounting of lower stiffness. This latter mounting of lower stiffness may be conveniently provided as part of a combined upper mounting assembly and acts vertically to carry the weight of the front end of the body on the combined assembly. Preferably two upper mountings are provided.

Preferably the lower mountings are interconnected by a torsionally stiff device such as a torsion bar or torsion tube to resist roll of the combined assembly relative to the longitudinal centreline of the vehicle. The resilient assembly is one in which the resultant axis of minimum stiffness of the mountings is in the plane of maximum imbalance of the power unit and the resultant axis of maximum stiffness of the mountings is perpendicular to the plane of maximum imbalance of the power unit.

An alternative mounting arrangement especially suitable for an inclined engine uses four main mountings two in front of and two behind the combined assembly. All the mountings are of the type having an axis of maximum stiffness and an axis of minimum stiffness perpendicular to it. The mountings behind the combined assembly are arranged with their axes of maximum stiffness substantially perpendicular to the vehicle and the mountings in front of the combined assembly are arranged with their axes of maximum stiffness substantially perpendicular to the plane of the cylinders which is the plane of maximum imbalance of the power unit. This arrangement gives a point of intersection of the axes of maximum stiffness of front and rear mountings behind and beneath the combined assembly.

Thus there will be a turning moment around the axis of convergence which will result from the upward force from the road due to the front axle weight of the vehicle when the suspension spring is incorporated in the combined assembly. This turning moment is opposed by another resulting from the weight of the combined assembly. In the case of the MacPherson strut version only the latter turning moment applies. In either case one or more low stiffness mountings may be employed, preferably in front of the engine, to counterbalance the resultant turning moment. Once again the resultant axis of minimum stiffness of the mountings is in the plane of maximum imbalance of the power unit, and the resultant axis of maximum stiffness of the mountings is perpendicular to the plane of maximum imbalance of the power unit.

It should be appreciated that alternative arrangements of the mountings in front of and behind the engine are also within the scope of the present invention, as is the use of alternative engines which may also be mounted longitudinally of the vehicle.

This invention avoids the use of an intermediate or subsidiary frame interposed between the power unit, suspension assembly and body and interposes the mass of the power unit between the mounting units to the body and vibrating forces of whatever origin which occur in the suspension assembly. As a result of this interposition there is substantial attenuation of vibration transmitted from the suspension and which would otherwise be apparent in the body.

Further aspects of the present invention will be apparent from the following description by way of example of the embodiments in conjunction with the attached diagrammatic drawings in which.

Figure 1:
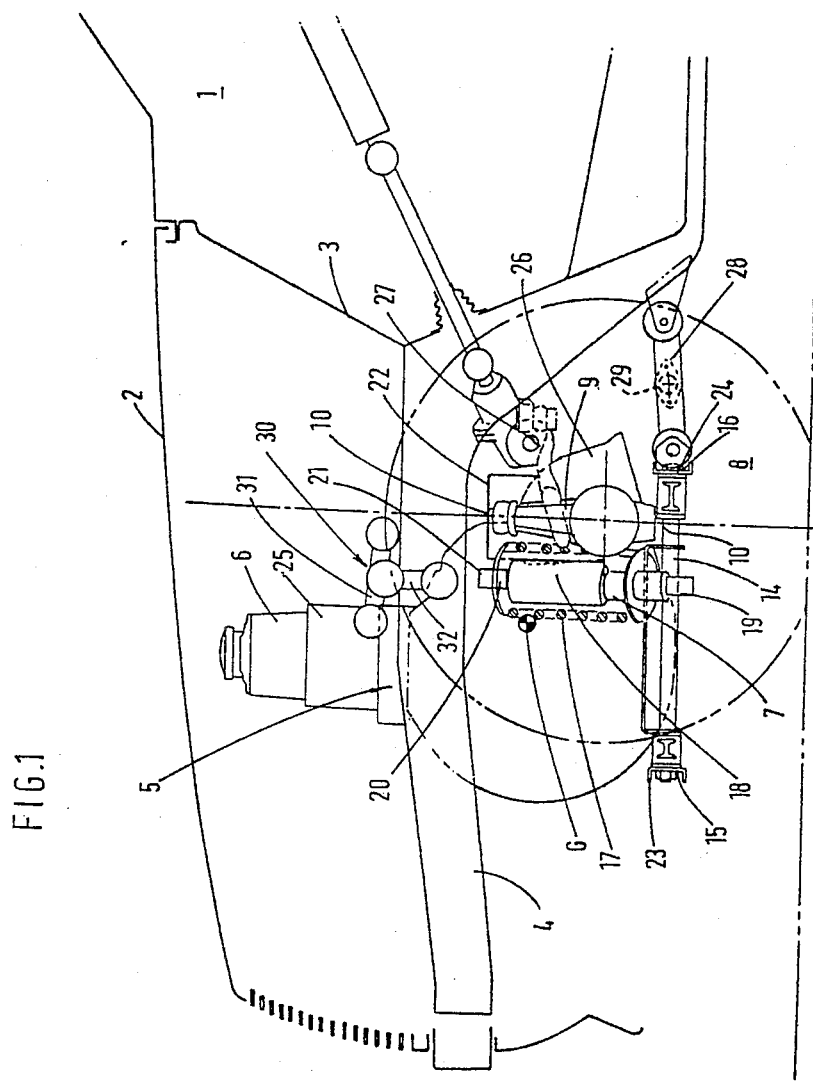
FIG. 1 is a side view of the front of a motor car having a suspension and power unit installation according to a first embodiment.
Figure 2:
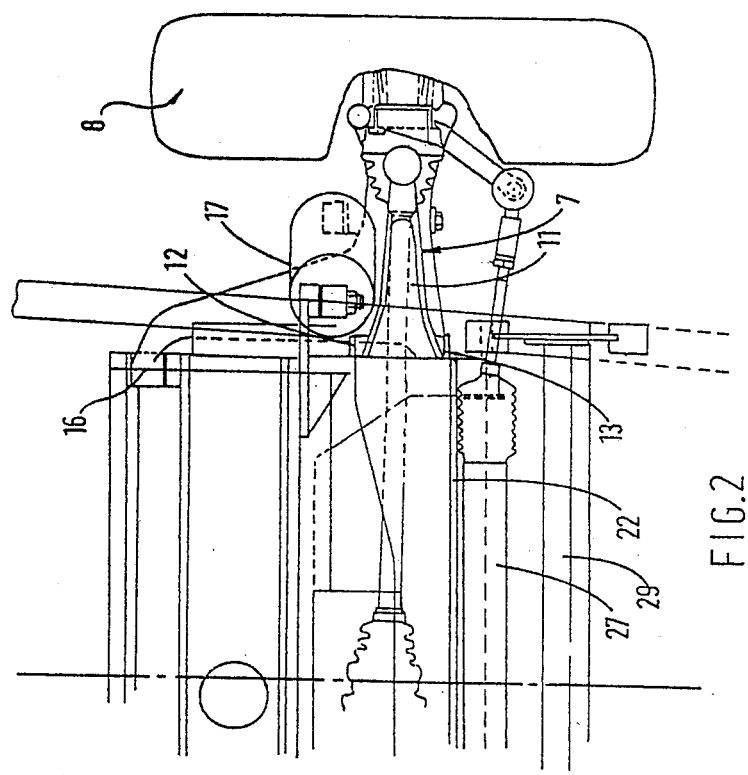
FIG. 2 is a half plan view of FIG. 1.
Figure 3:
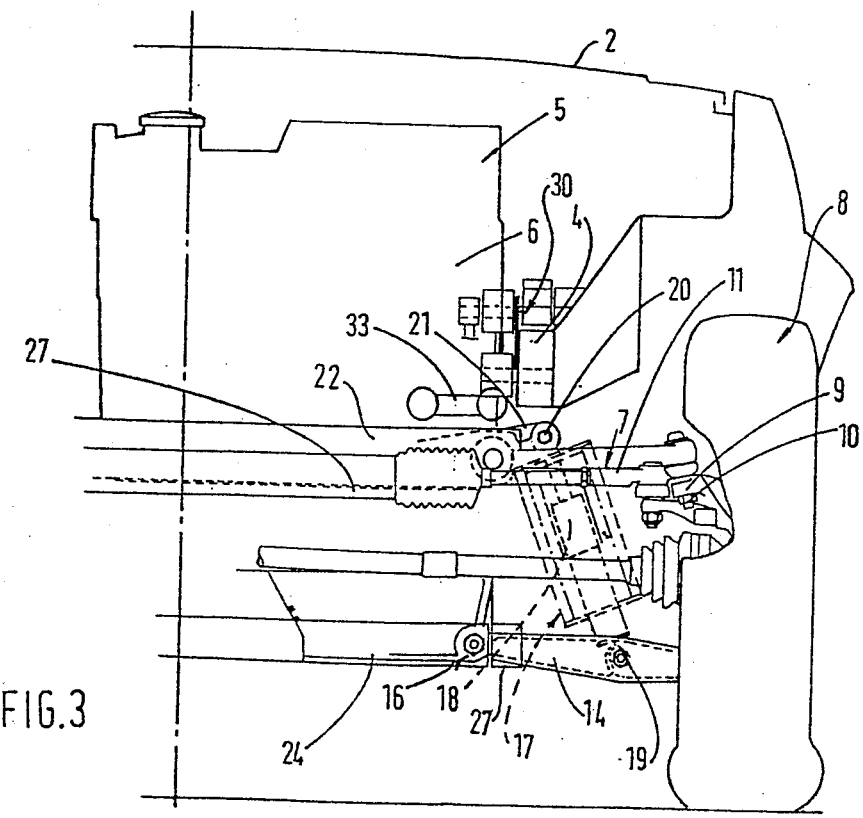
FIG. 3 is a half rear view of FIG. 1.

The assembly of FIG. 1 comprises a vehicle body 1 having a bonnet 2 and front bulkhead 3. A pair of forwardly-extending, substantially parallel side frames 4 are provided one at either side of the vehicle which delimit the engine bay in which a combined assembly 5 is mounted.

The combined assembly 5 comprises a power unit 6, coil spring wishbone type independent front suspension assemblies 7 and wheel and hub assemblies 8. The wheel and hub assemblies 8 are entirely conventional and include wheel hub, brake, wheel and tire.

The suspension assemblies 7 each comprise a front hub carrier 9 integral with the front wheel hub and top and bottom steering pivots 10. The top steering pivot 10 is connected to the outer end of an upper suspension wishbone 11 which has its inner ends 12 and 13 pivotally mounted upon the power unit 6 as shown. The lower steering pivot 10 is connected to the outer end of a lower suspension wishbone 14 which has its inner ends 60 pivotally mounted upon the power unit 6 at mounting points 15 and 16. A concentric coil spring 17 and telescopic damper 1 forming an assembly which is attached at its lower end 19 to the lower wishbone 14, and its upper end 20 attached to a bracket 21 which is rigidly attached to the power unit 6. The upper wishbone pivots at both ends of the power unit 6 are interconnected in this embodiment by a transverse member 22 which is attached to the power unit. The front mounting points 15 of the lower wishbones are interconnected by a channnel section tie member 23 and the rear mounting points 16 of the lower wishbone are interconnected by a channel section tie member 24. Both beams 23 and 24 and the upper beam 22 are to reduce both bending moments on the wishbone pivots and forces on the power unit due to the braking forces on the suspension.

The suspension assemblies 7 are thus basically conventional but most importantly are entirely mounted upon the power unit 6.

The power unit 6 shown in this embodiment comprises a four cylinder in line engine 25 which is positioned with the plane of the cylinders inclined vertically and a gear-box and final drive assembly 26 which is attached to the engine 25 to form a unitary power unit 6. A drive shaft (not shown) projects at either side of the power unit and extends to the hub and wheel assembly with the usual constant velocity joints for front wheel drive.

A rack-type steering gear 27 is mounted upon the rear of the power unit 6 and has an outer track rod link connecting each end of the transverse rack to the steering arms mounted on each wheel carrier.

Thus the combined assembly 5 comprises all the components of the wheels and suspension which are mounted to the power unit 6 as well as the gear-box and final drive assembly 26 and the steering gear 27.

The combined assembly 5 is mounted on the vehicle body 1 between the side frames 4 by resilient mountings. Two lower mountings 28, one at either side extend rearwardly of the vehicle from the rear lower wishbone mounting 16 to lower body mounting brackets 28. In this embodiment each lower mounting 28 comprises a rigid link with elastomeric bushes at each end through which mounting bolts are passed. The lower mountings 28 are slightly inclined rearwardly and upwardly. A transversely extending torsion tube or bar 29 is fastened between the lower mounting links. This interconnection provides increased rolling stiffness of the combined assembly relative to the body. Two upper mounting assemblies 30 are provided, one between each side frame 4 and each end of the power unit 6. Each upper mounting assembly 30 comprises two links 31 and 32 each with elastomeric bushes at both ends. The first link 31 extends rearwardly from the engine 6 to the side frame 4 at a slight downward angle and the second link 32 extends vertically between the engine 6 and the side frame 4. The characteristics of the two links are different as will be explained.

The combined assembly 5 is transversely located by means of a lateral locating link 33 which extends transversely of the vehicle between the engine 6 and the transverse member 22.

The inclined mounting links 28 and 31 converge to a point behind the engine bay of the vehicle. The result is that the combined assembly is positively located longitudinally of the vehicle in which direction the links 28 and 31 have a comparatively high stiffness, but these links have a low stiffness in the vertical direction which is the plane of maximum imbalance of the engine 6. The vertically disposed mounting links 32 thus carry the vertical forces arising between the power unit and the body and have a low stiffness so as to minimize transmission to the body of vertical vibrations including those arising in the plane of maximum secondary imbalance of the engine.

The assembly is (as shown) such that the centre of gravity G of the power unit 6 is in front of the front wheel centre line F. All the forces of vibration at the wheel hubs, whether they be road excited or originating from the vehicle wheel, tire, brake, transmission system or hub or fed directly into the substantial mass of the combined assembly. The combined assembly 5 also provides the required constant geometrical relationships between each wheel and the steering and suspension assemblies.

The low stiffness vertical links 32 at the top mountings 30 counterbalance the resultant turning moment arising from the weight of the body on the combined assembly 5 acting around the point of convergence of the inclined mounting struts 28 and 31.

The choice of mounting stiffness is made such that deflections due to traction and braking forces, including wheelbase change and king pin castor angle change, are limited to acceptable values. Also, because the bounce resonant frequency of the combined assembly is much lower than that of the wheel the vertical forces transmitted to the body which arise from wheel bounce over rough surfaces are greatly attenuated, thus providing a good standard of what is known as secondary ride comfort.

Figure 4:
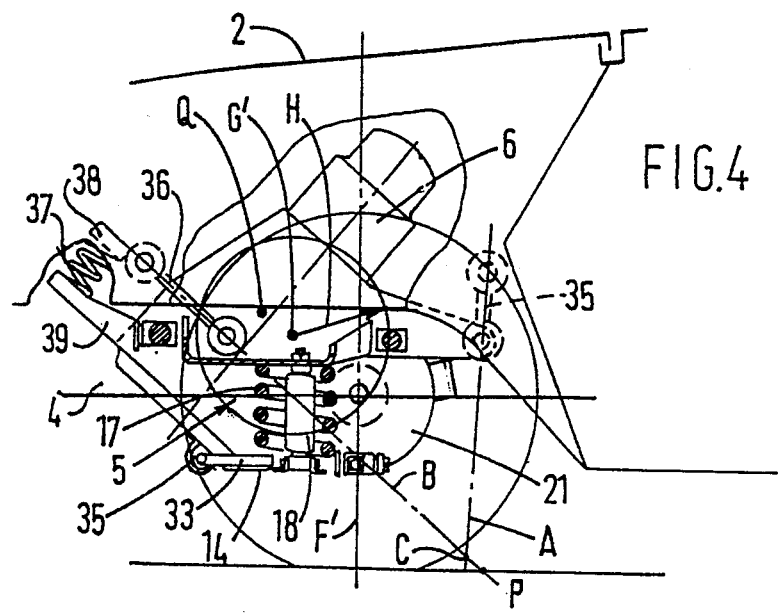
FIG. 4 is a side view of the front of a motor car having a suspension and power unit installation according to a second embodiment.
Figure 5:
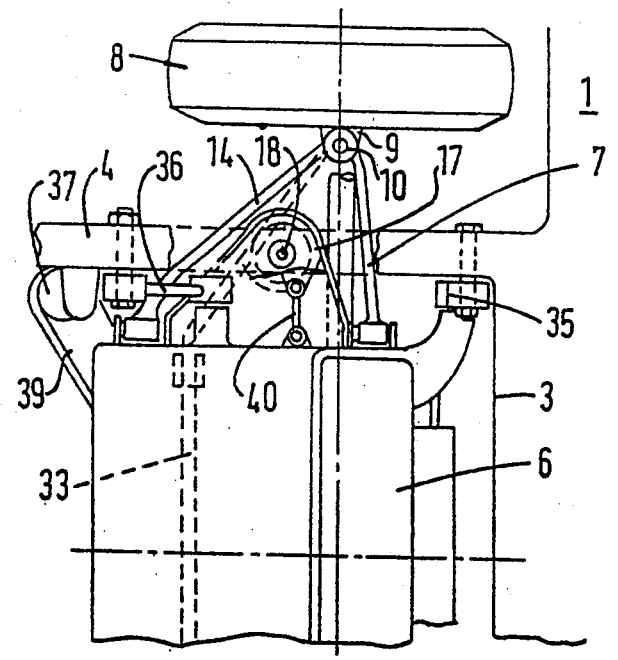
FIG. 5 is a half plan view of FIG. 4.

The second embodiment shown in FIGS. 4 and 5 has a combined assembly 5 basically the same as that of the first embodiment and like components have the same numerals. In this case, however, the power unit 5 is a four cylinder in line engine which is inclined rearwardly of the vehicle at 40° to the vertical plane.

An anti-roll bar 33 is mounted beneath the front of the power unit 6 in rubber bushes 35 and has its outer ends attached to the outer ends of the lower wishbones 14.

Thus once again the combined assembly 5 comprises all the components of the wheels and suspension which are mounted to the power unit 6 as well as the gear-box and final drive assembly 21 and the steering gear.

The complete combined assembly 5 is resiliently mounted in the vehicle body 1 between the side frames 4 by means of four main mountings 35 and 36 two at either side. Each mounting comprises a short rigid link with resilient rubber bushes one at each end through which mounting bolts are passed. The rear mountings 35 are arranged to have the rigid links substantially vertical so that each mounting has an axis of maximum stiffness A which is substantially vertical as shown. The front mountings 36 are arranged to have the rigid links so that each mounting has its axis of maximum stiffness B pointing towards the rear of the car and substantially perpendicular to the plane of maximum imbalance of the engine. The arrangement positions the point of intersection C of the axes of maximum stiffness A and B not far above ground level behind the front axle centre line F' as shown.

A transversely extending torsion tube (not shown) is provided interconnecting the front mountings 36 to provide rolling stiffness of the combined assembly 5 relative to the body 1.

As can be seen in FIG. 4 the centre of gravity G' of the power unit 6 is positioned in front of the front axle centre line F' and a pair of low stiffness secondary mounting units 37 are provided at the front of the power unit 6. The secondary mounting units 37 comprise coil springs of low rate which act at an angle as shown between an abutment 38 which is attached to the respective side frame 4 and a forwardly projecting arm 39 integral with the power unit 6.

The combined assembly is transversely located by means of a lateral locating link 40 which extends transversely of the vehicle between the power unit 6 and the side frame 4 (see FIG. 5). This is positioned in front of the front axle centre line F' and has its stiffness and the distance from the centre line F' chosen to provide the desired values of lateral stiffness and understeer deflection of the combined assembly 5 relative to the vehicle body 1.

Once again the resultant assembly provides that all the forces of vibration at the wheel hubs, whether they be road excited or originating from the vehicle wheel, tire, brake transmission system or hub are fed directly into the substantial mass of the combined assembly. The combined assembly 5 also provides the required constant geometrical relationships between each wheel and the steering and suspension assemblies.

Two modes of resonance of the combined assembly are rotational modes around transverse axes P and Q. The first transverse axis P is at the point of intersection C of the axes of maximum stiffness A and B of the mountings 35 and 36 and the second transverse axis Q is at the centre of pitch resonance of the combined assembly. Also shown in FIG. 4 is the radius of gyration H of the combined assembly.

The low stiffness mounting units 37 counter-balance the resultant turning moment arising from the weight of the combined assembly and the weight of the body acting around the transverse axis P of main mounting convergence.

Figure 6:
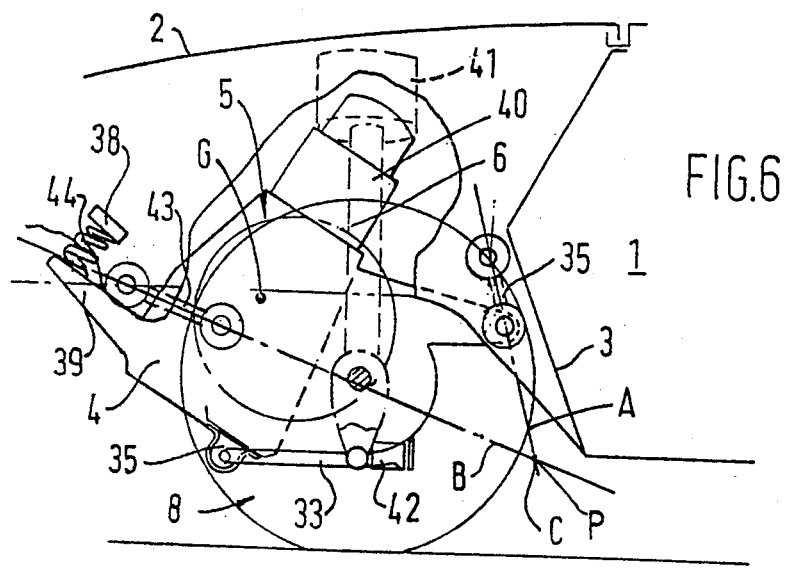
FIG. 6 is a side view of the front of a motor car having a suspension and power unit installation according to the third embodiment.
Figure 7:
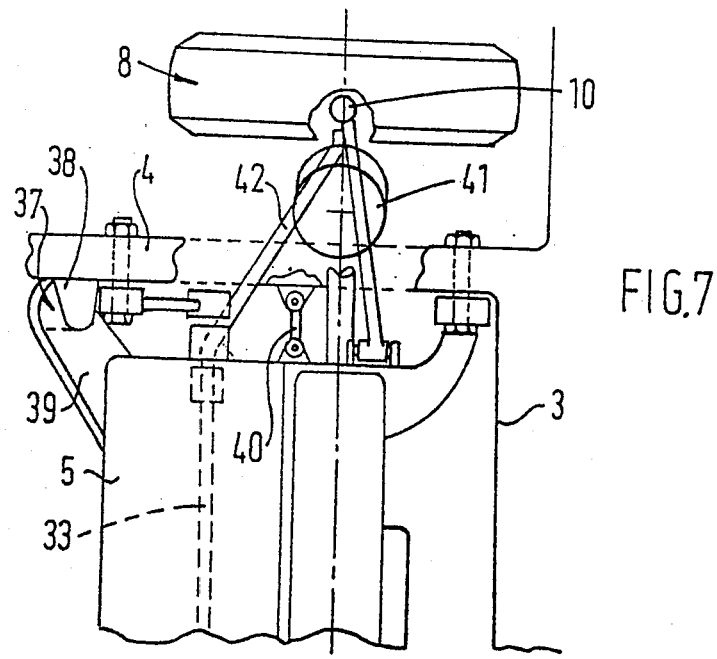
FIG. 7 is a half plan view of FIG. 6.

The third embodiment shown in FIGS. 6 and 7 is basically the same as the second embodiment having a combined assembly 5 comprising a power unit 6 and wheel and hub assemblies 8. In this case, however, the suspension is of the MacPherson strut type with suspension legs 40 comprising the usual combination of coil spring and damper. The top of each strut is mounted to the body 1 in the conventional manner by means of flexible rubber top mountings 41. The lower end of each strut is attached to a lower wishbone 42 which is mounted upon the power unit 6 as in the first embodiment.

Once again the steering gear and anti-roll bar are mounted on the power unit and the remaining details of the assembly are the same as the second embodiment except that in this case the engine 6 is backwardly inclined at an angle of 30° to the vertical and the front flexible mountings 43 and mountings 44 have their angles adjusted accordingly.

In this case the axes of maximum stiffness B and A of the front and rear mountings 43 and 35 are arranged to converge at a point C behind the front axle centre line at a height above the ground approximately equal to that of the ball joint connecting the bottom of the MacPherson strut 40 to the lower wishbone 42.

Once again the assembly in positioning the power unit between the lower wishbones and the body provides improved attenuation of road excited noise.

It will be appreciated that many details of the constructions described may be changed while still utilizing the present invention. For example other forms of suspension may be used so long as it is mounted on the power unit. Alternative mountings may be used for the mounting of the combined assembly in the vehicle body to the elastic links described; indeed any mounting having the required characteristics of flexibility and different stiffness in different directions may be used. In general the links described to give an understanding of the invention will be replaced by other mountings such as resilient elastomeric mountings each adapted to a particular installation to give the best stiffness insulation properties.

Furthermore the angles of the axes of maximum stiffness of the mountings may be changed according to the desired characteristics of vibration attenuation and vehicle handling. The low stiffness additional mountings described in the second and third embodiments may be in other positions including behind the power unit and/or the centre of gravity of the power unit may be behind the front axle centre line.

The anti-roll bar of the front suspension may be mounted on the vehicle body or on the combined assembly as described.

The power unit may be vertical or inclined forwardly or may have a longitudinally disposed crank shaft, and may have any other arrangement and number of cylinders.

Finally the mounting in the vehicle may be at different points to those described and by different numbers of mountings.

Having now described my invention, what I claim is:

1. A front wheel drive vehicle, comprising:
   (a) a body; (b) a front-mounted power unit; (c) front suspension assemblies;
   (d) a steering assembly, said suspension assemblies and said steering assembly being mounted on said power unit to form a combined assembly; and
   (e) flexible mountings connected directly between said body and said combined assembly, whereby said body is resiliently mounted and vibration forces from said power unit and the front wheels of the vehicle are attenuated in said combined assembly and said flexible mountings.

2. A front wheel drive vehicle according to claim 1 wherein the flexible mountings are arranged such that the resultant plane of minimum stiffness of the assembly of mountings is substantially in the direction of the plane of maximum imbalance of the power unit.

3. A front wheel drive vehicle according to claim 1 wherein the combined assembly is mounted in the vehicle body by a pair of lower mountings one at either side of the vehicle each of which have axes of substantial stiffness in the longitudinal direction of of the vehicle and which extend between the lower part of the combined assembly and the body and at least one upper mounting which also has its plane of maximum stiffness substantially longitudinally of the vehicle such that the mountings are substantially parallel and control the combined assembly in pitch.

4. A front wheel drive vehicle according to claim 3 wherein the pair of mountings and the upper mounting each extend rearwardly of the combined assembly to the vehicle body.

5. A front wheel drive vehicle according to claim 3 wherein the lower mountings or other mountings are interconnected by means of a roll bar or tube.

6. A front wheel drive vehicle according to claim 1 wherein the flexible mountings of the combined assembly each have an axis of maximum stiffness substantially perpendicular to an axis of minimum stiffness and the mounting behind the combined assembly have their axes of maximum stiffness substantially vertical and the other mountings in front of the combined assembly have their axes of maximum stiffness substantially perpendicular to the plane of maximum imbalance of the power unit.

7. A front wheel drive vehicle according to claim 6 wherein the power unit extends transversely of the vehicle and is inclined rearwardly such that the axes of maximum stiffness intersect behind the front axle centreline of the vehicle.

8. A front wheel drive vehicle claim 1 wherein the mountings include a low spring rate mounting which acts in the plane of maximum imbalance of the power unit to assist in supporting the vehicle body on the combined assembly.

9. A front wheel drive vehicle claim 1 wherein the suspension assemblies are of the spring and wishbone type and are mounted entirely upon the combined assembly.

10. A front wheel drive vehicle claim 1 wherein the suspension assemblies are of the MacPherson strut type having their lower ends connected by wishbones or levers to the combined assembly and their upper ends connected to the vehicle body by means of flexible mountings.

* * * * *